(12) United States Patent
LaPierre et al.

(10) Patent No.: US 8,845,282 B2
(45) Date of Patent: Sep. 30, 2014

(54) SEAL PLATE WITH COOLING PASSAGE

(75) Inventors: Todd M. LaPierre, Middleton, NH (US); Eric Charles Mundell, South Berwick, ME (US)

(73) Assignee: United Technologies Corporation, Hartford, CT (US)

( * ) Notice: Subject to any disclaimer, the term of this patent is extended or adjusted under 35 U.S.C. 154(b) by 465 days.

(21) Appl. No.: 13/247,518

(22) Filed: Sep. 28, 2011

(65) Prior Publication Data

US 2013/0078079 A1    Mar. 28, 2013

(51) Int. Cl.
*F01D 25/16* (2006.01)
*F01D 25/18* (2006.01)

(52) U.S. Cl.
CPC ............... *F01D 25/183* (2013.01); *F01D 25/16* (2013.01); *F05D 2240/55* (2013.01)
USPC ........................... 415/170.1; 415/230; 416/174

(58) Field of Classification Search
USPC .................... 415/170.1, 230, 229, 231, 168.2; 416/174; 277/352, 358, 370, 371, 390
See application file for complete search history.

(56) References Cited

U.S. PATENT DOCUMENTS

| | | | | |
|---|---|---|---|---|
| 2,308,114 A | * | 1/1943 | Schjolin | 277/371 |
| 2,857,182 A | * | 10/1958 | Bain et al. | 277/401 |
| 2,990,202 A | * | 6/1961 | Dennison | 277/399 |
| 2,992,842 A | * | 7/1961 | Shevchenko et al. | 277/306 |
| 3,194,492 A | * | 7/1965 | Koffinke et al. | 494/1 |
| 3,241,842 A | * | 3/1966 | Schweiger et al. | 277/543 |
| 3,578,343 A | * | 5/1971 | Taschenberg | 277/399 |
| 3,915,521 A | * | 10/1975 | Young | 384/467 |
| 4,123,069 A | * | 10/1978 | Sato | 277/391 |
| 4,406,459 A | * | 9/1983 | Davis et al. | 277/401 |
| 4,453,783 A | | 6/1984 | Davis et al. | |
| 4,457,667 A | * | 7/1984 | Seibert et al. | 415/229 |
| 4,463,994 A | * | 8/1984 | Eliason et al. | 384/506 |
| 4,542,623 A | * | 9/1985 | Hovan et al. | 60/226.1 |
| 4,623,297 A | * | 11/1986 | Beam, Jr. | 415/118 |
| 4,744,721 A | * | 5/1988 | Villeneuve | 415/113 |
| 4,928,978 A | * | 5/1990 | Shaffer et al. | 277/401 |
| 4,990,054 A | * | 2/1991 | Janocko | 415/111 |
| 5,385,409 A | | 1/1995 | Ide | |
| 5,464,227 A | | 11/1995 | Olson | |
| 5,593,165 A | | 1/1997 | Murray et al. | |
| 5,622,438 A | * | 4/1997 | Walsh et al. | 384/624 |
| 5,639,096 A | * | 6/1997 | Ullah | 277/401 |
| 5,722,167 A | * | 3/1998 | Duchamp et al. | 29/898.061 |
| 5,899,460 A | * | 5/1999 | Altieri | 277/352 |
| 6,257,589 B1 | * | 7/2001 | Flaherty et al. | 277/400 |
| 2007/0216107 A1 | | 9/2007 | Freling | |
| 2009/0184475 A1 | * | 7/2009 | Dobek et al. | 277/500 |

* cited by examiner

*Primary Examiner* — Edward Look
*Assistant Examiner* — Wayne A Lambert
(74) *Attorney, Agent, or Firm* — Kinney & Lange, P.A.

(57) ABSTRACT

A seal assembly for a gas turbine engine includes a carbon seal and a seal plate. The seal plate has a contact face configured to slidably engage the carbon seal. The seal plate has a surface disposed on an opposing side of the seal plate from the contact face. The surface forms a portion of a single passage that extends an entire length of the seal plate. The continuous cooling provided by single passage along the seal plate allows for a more uniform temperature profile along the contact face of seal plate.

12 Claims, 3 Drawing Sheets

US 8,845,282 B2

SEAL PLATE WITH COOLING PASSAGE

BACKGROUND

The present invention relates to gas turbine engines, and more particularly, to seals for bearing compartments of gas turbine engines.

The rotating shafts and other rotating turbomachinery of gas turbine engines are supported from a non-rotating structure by arrays of anti-friction bearings. In many engines, anti-friction bearings are enclosed in bearing compartments that allow the anti-friction bearings to be more easily lubricated and cooled.

Bearing compartments can be sealed around the shaft by various types of seals including a seal assembly with a carbon seal and a seal plate. The seal plate is mounted on the shaft to rotate therewith and has a contact face which engages and interfaces with the fixed carbon seal. The carbon seal is movable (axially relative to the shaft) against and away from the seal plate by springs and air pressure. Typically, the interfacing surfaces that comprise the contact face of the seal plate and the contact face of the carbon seal are lubricated to minimize friction and wear.

The bearing and other components of the bearing compartment including the carbon seal and the seal plate are cooled and lubricated by oil supplied from other locations in the gas turbine engine. In certain smaller gas turbine models and in locations within the gas turbine where the bearing compartments are disposed in small envelopes with limited space, under-the-bearing race cooling can be utilized to facilitate the transfer of oil to the bearing, and other components of the bearing compartment. The under-the-bearing race cooling thereby avoids the use of a nozzle and saves space within the bearing compartment.

Unfortunately, under-the-bearing race cooling utilizes a plurality of distinct lubricant passages that pass through the seal plate. These distinct lubricant passages in the seal plate result in the contact face of the seal plate experiencing a non-uniform temperature profile along the extent of its circumference (i.e. portions of the contact face disposed near a lubricant passage will have a lower temperature than portions disposed further away from the lubricant passage). The non-uniform temperature profile along the contact face can result in physical warping or distortion of the contact face leading to increased wear of the seal assembly and unwanted amounts of oil passing between the carbon seal and the seal plate out of the bearing compartment.

SUMMARY

A seal assembly for a gas turbine engine includes a carbon seal and a seal plate. The seal plate has a contact face configured to slidably engage the carbon seal. The seal plate has a surface disposed on an opposing side of the seal plate from the contact face. The surface forms a portion of a single passage that extends an entire length of the seal plate.

In one embodiment, the single passage is additionally formed by a film plate that interfaces with the seal plate along the opposing side of the seal plate. In the embodiment, the surface of the film plate and the surface of the seal plate are disposed at a distance from each other to form a gap that acts as the single passage.

In a second embodiment, the single passage is formed by a bearing race that interfaces with the seal plate along the opposing side. In the second embodiment, the surface of the race and the surface of the seal plate are disposed at a distance from each other to form a gap that acts as the single passage.

DETAILED DESCRIPTION

Figure 1:
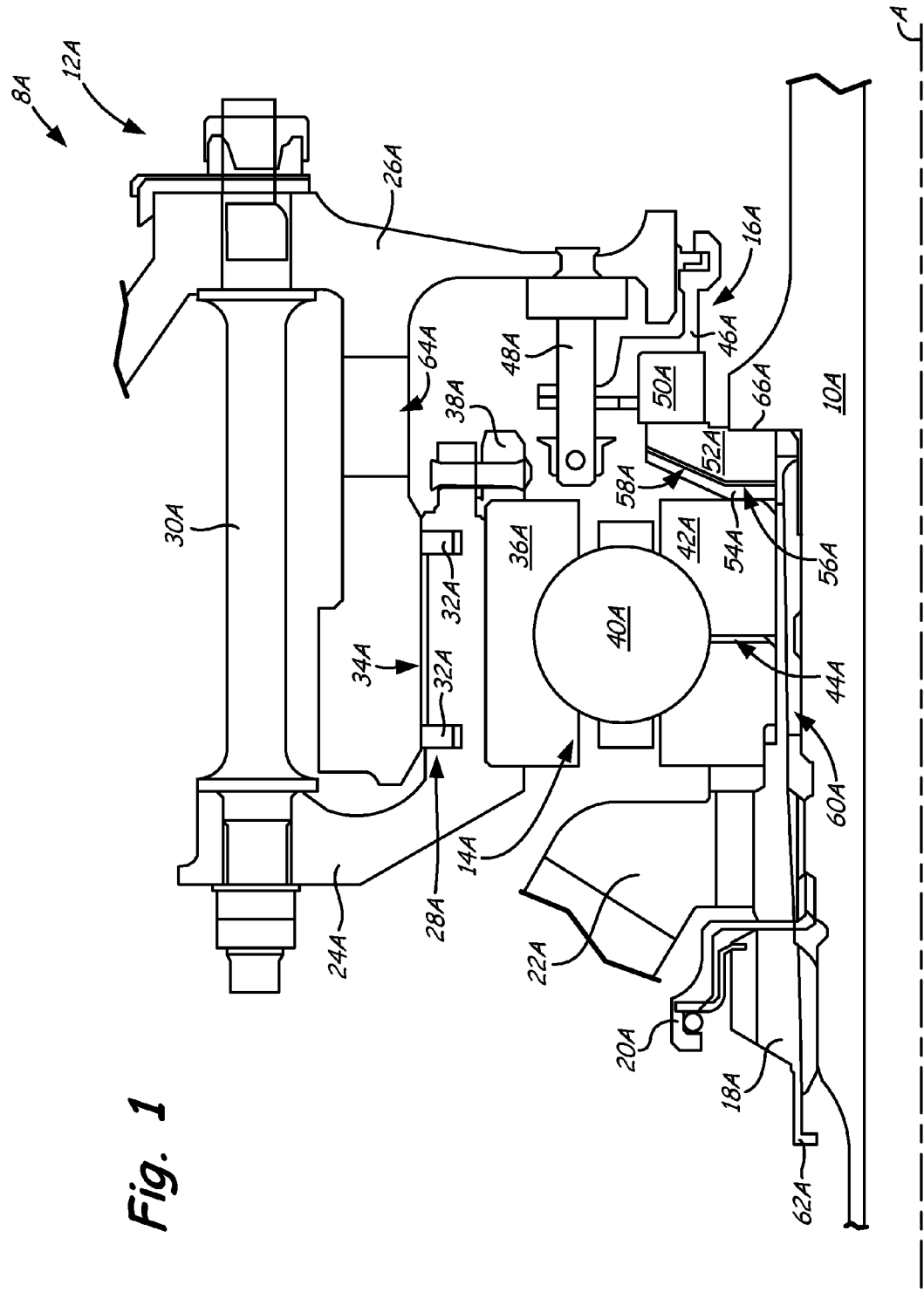
FIG. 1 is a schematic cross-sectional view of a first embodiment of a bearing compartment including a bearing and a seal assembly.

FIG. 1 shows a portion of a cross-sectional view of a gas turbine engine 8A which includes a shaft 10A and a bearing compartment 12A. Bearing compartment 12A houses a bearing assembly 14A and a seal assembly 16A. Bearing compartment 12A also includes a nut 18A, a lock 20A, a bull gear 22A, a bearing housing 24A, a bearing support 26A, a squeeze film damper 28A, and dampening rods 30A. Squeeze film damper 28A includes seals 32A and a cavity 34A. Bearing assembly 14A includes an outer race 36A, a nut 38A, balls 40A, and an inner race 42A. Inner race 42A includes passages 44A. Seal assembly 16A includes a retaining element 46A, a bias element 48A, a carbon seal 50A, a seal plate 52A, a film plate 54A, radial passages 56A, and single passage 58A. Together nut 18A, bull gear 22A and shaft 10A form passage 60A.

Shaft 10A is rotatable about axis A and forms a radially inward boundary of bearing compartment 12A. Bearing compartment 12A comprises the area radially outward of shaft 10A. As will be discussed subsequently, in addition to shaft 10A bearing compartment 12A is bounded by stator portions of gas turbine engine 8A such as a housing. Bearing assembly 14A is mounted to shaft 10A and components of bearing compartment 12A. Bearing compartment 12A additionally houses seal assembly 16A adjacent bearing assembly 14A.

Nut 18A is disposed on shaft 10A and is affixed thereto by lock 20A. Nut 18A has an axial scoop 62A extending therefrom adjacent shaft 10A. Nut 18A abuts bull gear 22A which is disposed adjacent to, as well as between, bearing assembly 14A and shaft 10A. The outer radial portion of bearing assembly 14A is connected to and supported by bearing housing 24A. Bearing housing 24A interfaces with bearing support 26A. Together bearing housing 24A and bearing support 26A form portions of squeeze film damper 28A, which is disposed therebetween. Dampening rods 30A (only one is shown in FIG. 1) connect bearing housing 24A to bearing support 26A.

Squeeze film damper 28A is comprised of seals 32A disposed in bearing housing 24A. Seals 32A abut bearing support 26A. Squeeze film damper 28A is bordered by bearing housing 24A and bearing support 26A as well as axially set apart seals 32A. Cavity 34A is disposed between axially set apart seals 32A and between bearing housing 24A and bearing support 26A.

Bearing assembly 14A is disposed radially inward of squeeze film damper 28A. In particular, outer race 36A interfaces with an inner diameter surface of bearing housing 24A. Bearing housing 24A has threads that receive the threaded outer diameter of nut 38A, or similar fastening attachment therein. Nut 38A contacts a rearward portion of outer race 36A and holds outer race 36A in a desired position relative bearing housing 24A, bearing support 26A, and other components of gas turbine engine 8A. Nut 38A can be removed for assembly and repair of bearing assembly 14A and bearing housing 24A.

Outer race 36A has an arcuate shape and is disposed about engine centerline and axis A of shaft 10A. The inner surface of outer race 36A is shaped to receive a plurality of balls 40A therein (only a single ball 40A is illustrated in the section shown in FIG. 1). Balls 40A are also received by the outer surface of inner race 42A. Inner race 42A is disposed on bull gear 22A adjacent seal plate 52A and abutting film plate 54A. In other embodiments, inner race 42A can be disposed directly on shaft 10A and may be disposed at a distance from so as not to abut film plate 54A. Inner race 42A has passages 44A that extend radially therethrough to allow oil to be communicated to the inner surfaces of bearing assembly 14A.

Seal assembly 16A is disposed adjacent bearing assembly 14A. Retaining element 46A is movably connected to stationary bearing support 26A and bias element 48A. Bias element 48A is fastened to inner radial portion of bearing support 26A and extends therefrom into bearing compartment 12A. Face seal (in the embodiment shown comprising a carbon seal 50A) is mounted to retaining element 46A and is disposed to interface with seal plate 52A. Unlike carbon seal 50A which is axially movable, seal plate 52A is mounted on shaft 10A and bull gear 22A and rotates therewith. Film plate 54A is disposed on bull gear 22A and abuts seal plate 52A along a first side and abuts inner race 42A along a second opposing side from the first side. In other embodiments, seal plate 52A and film plate 54A are mounted directly to shaft 10A.

As shown in FIG. 1, seal plate 52A and film plate 54A comprise separate components. A plurality of radial passages 56A are disposed in a surface of film plate 54A along inner radial portion of the first side of film plate 54A. Radial passages 56A communicate with single passage 58A formed by a gap between an outer radial portion of film plate 54A and an outer radial portion of seal plate 54A. Single passage 58A extends an entire length along the circumference of the seal plate 52A about shaft 10A. Single passage 58A communicates with passage 60A via radial passages 56A. Passage 60A extends generally axially and is formed by shaft 10A, bull gear 22A, and nut 18A. Passage 60A extends radially beneath inner race 42A of bearing assembly 14A and has an inlet at scoop 62A of nut 18A and an outlet at the outer radial edge of film plate 54A and an outer radial edge of seal plate 52A. In other embodiments not utilizing bull gear 22A, passage 60A can extend through shaft 10A or can be formed by shaft 10A or race 42A and additional components such as a spacer. In such embodiments, components such as seal plate 52A, film plate 54A and inner race 42A can be mounted directly to shaft 10A or can be mounted on additional components such as a spacer.

Nut 18A, lock 20A, bull gear 22A, inner race 42A, seal plate 52A, and film plate 54A are mounted to shaft 10A. In particular, nut 18A is tightened to apply a load through bull gear 22A, inner race 42A, an inner radial portion of film plate 54A, and an inner radial portion of seal plate 54A to shoulder 66A of shaft 10A to mount the assembly.

Bull gear 22A is used for power extraction and the design and construction of such gears is further described in U.S. Pat. No. 7,743,600 by Babu et al. and U.S. Pat. No. 5,113,713 by Isabelle et al., which are incorporated herein by reference.

Bearing compartment 12A allows bearing assembly 14A to be more easily lubricated and cooled. Oil is introduced to the bearing compartment 12A by, for example, an oil jet (not shown) from elsewhere in gas turbine engine 8A. Once introduced into bearing compartment 12A, a portion of the oil is collected by axial scoop 62A and passes through and along nut 18A and bull gear 22A along passage 60A. Passage 60A communicates with passage 44A to allow oil to lubricate the interior surfaces of bearing assembly 14A. Additionally, passage 60A communicates with single passage 58A via radial passages 56A to allow oil to flow to seal assembly 16A and other portions of bearing compartment 12A including exterior surfaces of bearing assembly 14A.

Bias element 48A, in one embodiment a spring, exerts a desired axial (in other embodiments radial) force on retaining element 46A to position carbon seal 50A, which interfaces with rotating seal plate 52A. The force exerted by bias element 48A positions carbon seal 50A to allow a desired amount of air to flow between carbon seal 50A and seal plate 52A into bearing compartment 12A. This arrangement also allows a desired amount of oil to reach the interface between carbon seal 50A and seal plate 52A in order to lubricate the interface and reduce wear therebetween. Bearing support 26A also has lubricant passages 64A (only one is shown in FIG. 1) that scavenge oil away from bearing compartment 12A by providing a drain path for lubricant to be carried to appropriate lubricant collection and transport apparatuses (not shown).

Bearing housing 24A and bearing support 26A support and maintain the position of outer race 36A relative shaft 10A, inner race 42A, and balls 40A. Bearing support 26A reacts loads from shaft 10A (via bearing assembly 14A) to other stator portions of gas turbine engine 8A. Bearing housing 24A with dampening rods 30A has a spring rate capable of centering bearing assembly 14A after bearing assembly 14A shifts radially relative to shaft 10A. The spring rate of bearing housing 24A can be adjusted and optimized as desired by selecting the number, size, and shape of dampening rods 30A. Additionally, squeeze film damper systems such as the one disclosed herein are well known in the art and are used to shift critical speeds and/or to increase the dynamic stability of a rotor-bearing system. In particular, as shown in FIG. 1 squeeze film damper 28A provides damping to bearing assembly 14A to damp vibrations in shaft 10A using a pressurized damping lubricant, in most instances oil. As previously explained, the lubricant is pressurized and transported to bearing compartment 12A where it is communicated to squeeze film damper 28A.

Figure 2:
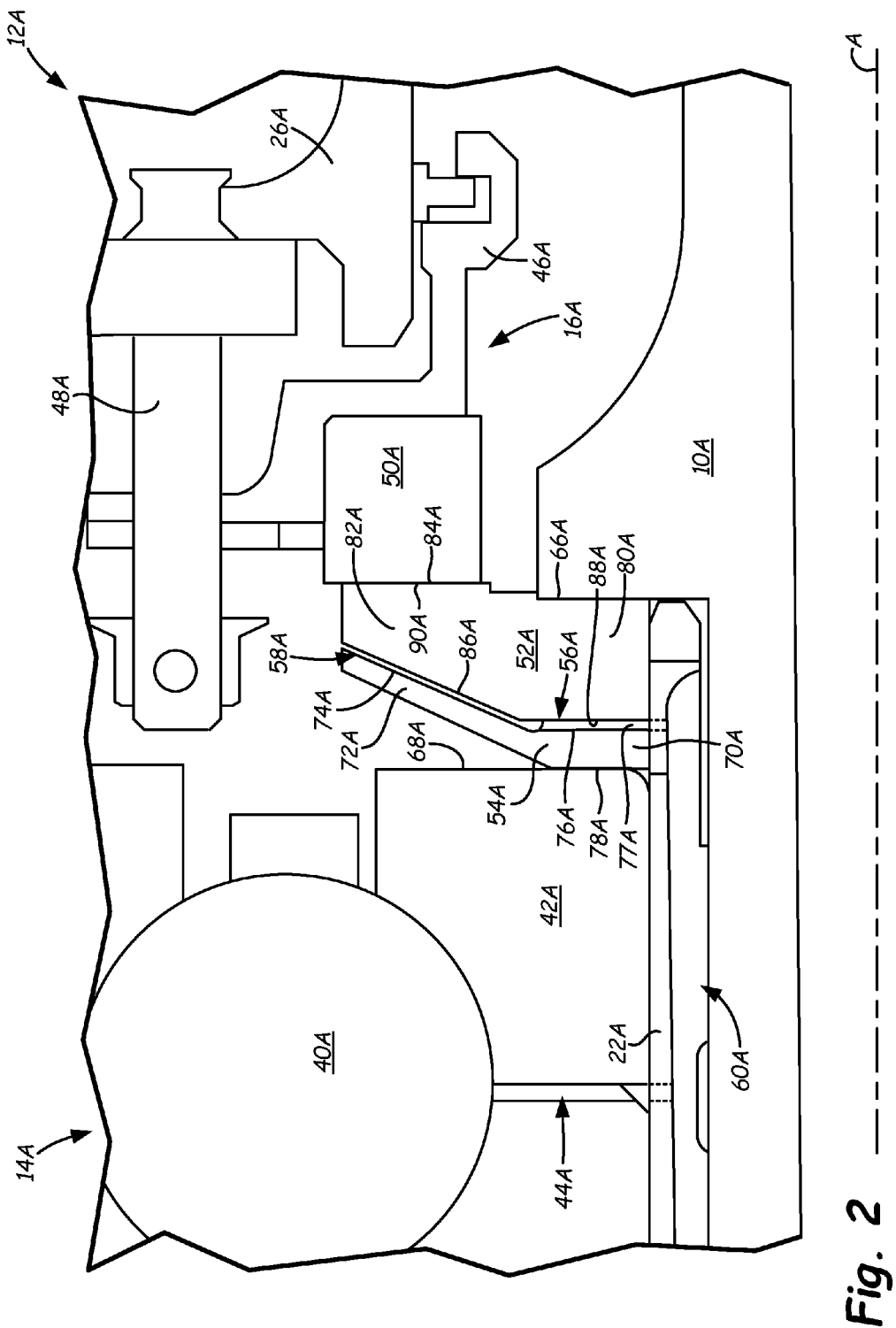
FIG. 2 is an enlarged view of the bearing compartment of FIG. 1 including a seal plate and a film plate.

FIG. 2 shows an enlarged view of portions of bearing compartment 12A. In particular, FIG. 2 shows inner race 42A, carbon seal 50A, seal plate 52A, film plate 54A, and passages 44A, 56A, 58A, and 60A. Additionally, inner race 42A includes a surface 68A. Film plate 54A includes an inner radial portion 70A, an outer radial portion 72A, a first surface 74A, a second surface 76A, and a third surface 78A. Seal plate 52A includes an inner radial portion 80A, an outer radial portion 82A, a contact face 84A, a first surface 86A, and a second surface 88A. Carbon seal 50A includes a contact face 90A.

Surface 68A of inner race 42A extends generally radially with respect to axis A of shaft 10A. Surface 68A abuts inner radial portion 70A of film plate 54A along surface 78A. Arcuate inner radial portion 70A is disposed on bull gear 22A adjacent shaft 10A. In the embodiment shown, inner radial portion 70A has a generally constant axial thickness and extends generally radially outward with respect to axis A to transition to outer radial portion 72A. Outer radial portion 72A has a relatively uniform cross-sectional shape, is tilted directionally toward carbon seal 50A, and thus, extends radially as well as axially with respect to axis A. The angle of tilt of outer radial portion 72A toward carbon seal 50A can be between 0° and 90°.

Outer radial portion 72A has first surface 74A that extends axially and radially along with outer radial portion 72A. First surface 74A interfaces with and is disposed at a distance from seal plate 52A.

First surface 74A forms a portion of single passage 58A, and thus, extends an entire length along the circumference of film plate 54A about axis A of shaft 10A. First surface 74A is connected to second surface 76A, which interfaces and abuts seal plate 52A. Second surface 76A extends generally radially relative to axis A. Second surface 76A has a plurality of features 77A such as grooves, slots, or indentations therein. The features 77A extend generally radially from adjacent shaft 10A to adjacent first surface 74A. The features 77A form portions of radial passages 56A, (along with second surface 88A of seal plate 52A) which communicate with single passage 58A. Additionally, radial passages 56A communicate with passage 60A.

Arcuate inner radial portion 80A of seal plate 52A is disposed on bull gear 22A and abuts shoulder 66A of shaft 10A. In the embodiment shown, inner radial portion 80A has in general a constant cross-section in the axial direction and extends generally radially outward with respect to axis A to transition to outer radial portion 82A. Outer radial portion 82A has contact face 84A that interfaces with and is configured to slidably engage contact face 90A of carbon seal 50A. Outer radial portion 82A has a conical cross-sectional shape that decreases in cross-sectional area as outer radial portion 82A extends away from axis A.

Surface 86A is disposed on an opposing side of seal plate 52A from contact face 84A. Surface 86A extends axially and radially with outer radial portion 82A and extends generally parallel to and at a distance from first surface 74A. In one embodiment, the distance between first surface 74A and surface 86A is between 0.05 mils and 100 mils (0.013 mm and 2.54 mm). Thus, together first surface 74A of film plate 54A and surface 86A form single passage 58A. In the embodiment shown, passage 58A is shown with a uniform linear gap between first surface 74A of film plate 54A and surface 86A of seal plate 52A. In other embodiments, gap of passage 58A may converge or diverge as passage 58A extends toward interior of bearing compartment 12A (FIG. 1). In other embodiments, passage 58A may be nonlinear shape along the circumference of seal plate 52A and film plate 54A such that single passage may have a curvature, convolutes, or some other geometry as desired. Single passage 58A extends an entire length along the circumference of seal plate 52A. Surface 86A is connected to second surface 88A, which interfaces and abuts film plate 54A.

As previously discussed, oil is collected by axial scoop 62A (FIG. 1) and passes through and along nut 18A (FIG. 1) and bull gear 22A along passage 60A. Passage 60A communicates with passage 44A to allow oil to lubricate the interior surfaces of bearing assembly 14A. Additionally, passage 60A communicates with single passage 58A via radial passages 56A to allow oil to flow to seal assembly 16A and other portions of bearing compartment 12A including exterior surfaces of bearing assembly 14A. The size and number of passages 44A, 60A, 56A, and 58A are application specific and will vary based upon factors such as the oil flow rate and the amount of heat needed to be removed from bearing assembly 14A, seal assembly 16A, and other components. A continuous cooling passage along or through seal plate 52A (such as provided by single passage 58A) allows for a more uniform temperature profile along contact face 84A of seal plate 52A. Thus, single passage 58A results in a reduction in the likelihood of physical warping or distortion of contact face 84A and decreases the likelihood of excessive wear of seal assembly 16A.

Figure 3:
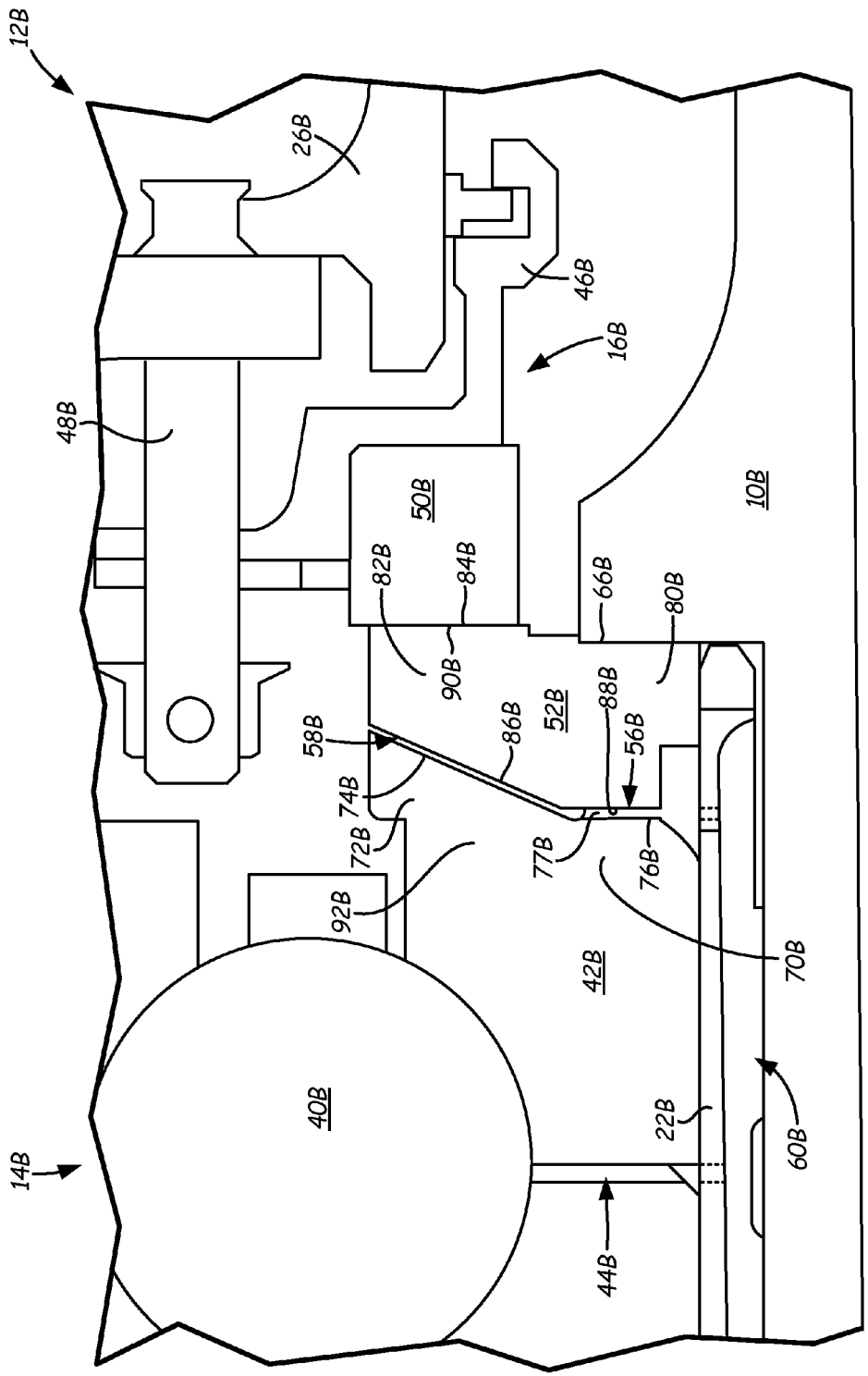
FIG. 3 is an enlarged view of another embodiment of a bearing compartment.

FIG. 3 shows an enlarged view of a second embodiment of a bearing compartment 12B mounted on a shaft 10B. Bearing compartment 12B operates and is configured in a manner similar to bearing compartment 12A (FIGS. 1 and 2). Bearing compartment 12B includes a bearing assembly 14B, a seal assembly 16B, a bull gear 22B, and a bearing support 26B. Seal assembly 16B includes a retaining element 46B, a bias element 48B, a carbon seal 50B, a seal plate 52B, radial passages 56B, and single passage 58B. Bearing assembly 14B includes balls 40B, inner race 42B with passages 44B. Additionally, inner race 42B includes an integral extension 92B. Integral extension 92B includes an inner radial portion 70B, an outer radial portion 72B, a first surface 74B, and a second surface 76B. Seal plate 52B includes an inner radial portion 80B, an outer radial portion 82B, a contact face 84B, a surface 86B, and a second surface 88B. Carbon seal 50B includes a contact face 90B.

Integral extension 92B to inner race 42B has an arcuate inner radial portion 70B disposed on bull gear 22B adjacent shaft 10B. In the embodiment shown, inner radial portion 70B has a generally constant axial thickness and extends generally radially outward with respect to axis A to transition to outer radial portion 72B. Outer radial portion 72B has a conical cross-sectional shape and is tilted directionally toward carbon seal 50B, and thus, extends radially as well as axially with respect to axis A.

Outer radial portion 72B has first surface 74B that extends axially and radially along with outer radial portion 72B. First surface 74B interfaces with and is disposed at a distance from seal plate 52B. First surface 74B forms a portion of single passage 58B, and thus, extends an entire length of inner race 42B and seal plate 52B about axis A of shaft 10B.

First surface 74B is connected to second surface 76B, which interfaces and abuts seal plate 52B. Second surface 76B extends generally radially relative to axis A. Second surface 76B has a plurality of features 77B such as grooves, slots, or indentations therein. The features 77B extend generally radially from adjacent shaft 10B to adjacent first surface 74B. The features 77B form portions of radial passages 56B, (along with second surface 88B of seal plate 52B) which communicate with single passage 58B along an inner radial portion thereof. Radial passages 56B also communicate with passage 60B.

Arcuate inner radial portion 80B of seal plate 52B is disposed on bull gear 22B and abuts shoulder 66B of shaft 10B. In the embodiment shown, inner radial portion 80B has a generally constant cross-section in the axial direction and extends generally radially outward with respect to axis A to transition to outer radial portion 82B. Outer radial portion 82B has contact face 84B that interfaces with and is configured to slidably engage contact face 90B of carbon seal 50B. Outer radial portion 82B has a conical cross-sectional shape that decreases in cross-sectional area as outer radial portion 82B extends away from axis A.

Surface 86B is disposed on an opposing side of seal plate 52B from contact face 84B. Surface 86B extends axially and radially with outer radial portion 82B and extends generally parallel to and at a distance from first surface 74B. Thus, together first surface 74B of inner race 42B and surface 86B form single passage 58B. Single passage 58B extends an entire length of seal plate 52B about axis A. As previously discussed, surface 86B is connected to second surface 88B, which interfaces and abuts inner race 42B.

The continuous cooling passage along seal plate 52B provided by single passage 58B allows for a more uniform temperature profile along contact face 84B of seal plate 52B. Thus, single passage 58B results in a reduction in the likelihood of physical warping or bending of contact face 84B and decreases the likelihood of excessive wear of seal assembly 16B.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly comprising:
   a face seal;
   a seal plate having a contact face configured to slidably engage the face seal, the seal plate having a surface disposed on an opposing side of the seal plate from the contact face, the surface forms a portion of a single passage that extends an entire length along the circumference of the seal plate;
   a film plate interfacing the seal plate along the opposing side of the seal plate, wherein a surface of the film plate and the surface of the seal plate are disposed at a distance from each other and together form the single passage; and
   wherein the film plate has a second surface disposed along an inner radial portion thereof, and wherein the second surface has a plurality of grooves therein which communicate with the single passage,
   wherein the grooves extend generally radially with respect to an axis of rotation of a shaft of a gas turbine engine, and wherein the grooves communicate with one or more axial passages that extend generally axially with respect to the axis of rotation of the shaft radially beneath an inner radial race of a bearing assembly, and
   wherein the one or more axial passages are in direct communication with the single passage via the grooves, such that oil is directly communicated from the one or more axial passages to a bearing compartment.

2. The seal assembly of claim 1, wherein the surface of the film plate that forms a portion of the single passage is disposed along an outer radial portion of the film plate.

3. The seal assembly of claim 2, wherein the surface of the film plate extends both radially and axially with respect to an axis of rotation of a shaft of a gas turbine engine, and wherein the film plate is tilted directionally toward the face seal.

4. The seal assembly of claim 3, wherein the film plate is tilted directionally toward the face seal at an angle of between 0° and 90°.

5. The seal assembly of claim 1, wherein the distance between the surface of the film plate and the surface of the seal plate is between substantially 0.50 mils and 100 mils (0.013 mm and 2.54 mm).

6. A seal assembly comprising:
   a face seal;
   a seal plate having a contact face configured to slidably engage the face seal, the seal plate having a surface disposed on an opposing side of the seal plate from the contact face, the surface forms a portion of a single passage that extends an entire length along the circumference of the seal plate; and
   a race interfacing the seal plate along the opposing side of the seal plate; wherein a surface of the race and the surface of the seal plate are disposed at a distance from each other and together form the single passage;
   wherein the race has a second surface disposed along an inner radial portion thereof, and wherein the second surface has a plurality of grooves therein which communicate with the single passage,
   wherein the grooves extend generally radially with respect to an axis of rotation of a shaft of a gas turbine engine, and wherein the grooves communicate with one or more axial passages that extend generally axially with respect to the axis of rotation of the shaft radially inward of the race, and
   wherein the one or more axial passages are in direct communication with the single passage via the grooves, such that oil is directly communicated from the one or more axial passages to a bearing compartment.

7. The seal assembly of claim 6, wherein the surface of the race that forms a portion of the single passage is disposed along an outer radial portion of the race.

8. The seal assembly of claim 7, wherein the surface of the race extends both radially and axially with respect to an axis of rotation of a shaft of a gas turbine engine, and wherein the surface of the race is tilted directionally toward the face seal.

9. A seal assembly for a gas turbine engine comprising:
   a carbon seal;
   a seal plate having a contact face configured to slidably engage the carbon seal, the seal plate having a surface disposed on an opposing side of the seal plate from the contact face; and
   a film plate interfacing the seal plate along the opposing side of the seal plate, wherein a surface of the film plate and the surface of the seal plate are disposed at a distance from each other and together form a single passage therebetween,
   wherein the film plate has a second surface disposed along an inner radial portion thereof, and wherein the second surface has a plurality of grooves therein which communicate with the single passage,
   wherein the grooves extend generally radially with respect to an axis of rotation of a shaft of a gas turbine engine, and wherein the grooves communicate with one or more axial passages that extend generally axially with respect to the axis of rotation of the shaft radially beneath an inner radial race of a bearing assembly, and
   wherein the one or more axial passages are in direct communication with the single passage via the grooves, such that oil is directly communicated from the one or more axial passages to a bearing compartment.

10. The seal assembly of claim 9, wherein the surface of the film plate that forms a portion of the single passage is disposed along an outer radial portion of the film plate.

11. The seal assembly of claim 10, wherein the surface of the film plate extends both radially and axially with respect to an axis of rotation of a shaft of the gas turbine engine, and wherein the film plate is tilted directionally toward the carbon seal.

12. A gas turbine engine comprising:
    a shaft having an axis of rotation;
    a stator housing disposed adjacent to and radially outward of the shaft;
    a carbon seal mounted on the stator housing;
    a seal plate mounted to the shaft and having a contact face configured to slidably engage the carbon seal, the seal plate having a surface disposed on an opposing side of the seal plate from the contact face, the surface forms a portion of a single passage that extends an entire length along the circumference of the seal plate; and a bearing assembly disposed between the shaft and the stator housing, the bearing assembly including an inner radial race, wherein the inner radial race is mounted on the shaft and is disposed to interface with the seal plate along the opposing side of the seal plate, and wherein a surface of the inner radial race and the surface of the seal plate are disposed at a distance from each other and together form the single passage, wherein the inner radial race has a second surface having a plurality of grooves therein which communicate with the single passage, wherein the grooves extend generally radially with respect to an axis of rotation of a shaft of a gas turbine engine, and wherein the grooves communicate with one or more axial passages that extend generally axially with respect to the axis of rotation of the shaft radially inward of the inner radial race, and wherein the one or more axial passages are in direct communication with the single passage via the grooves, such that oil is directly communicated from the one or more axial passages to a bearing compartment.

\* \* \* \* \*